(12) United States Patent
Sandmeier

(10) Patent No.: US 8,376,340 B2
(45) Date of Patent: Feb. 19, 2013

(54) WORKPIECE CLAMPING FIXTURE

(75) Inventor: Bruno Sandmeier, Birrwil (CH)

(73) Assignee: Erowa AG, Reinach (CH)

( * ) Notice: Subject to any disclaimer, the term of this patent is extended or adjusted under 35 U.S.C. 154(b) by 562 days.

(21) Appl. No.: 12/322,509

(22) Filed: Feb. 3, 2009

(65) Prior Publication Data

US 2009/0236787 A1    Sep. 24, 2009

(30) Foreign Application Priority Data

Feb. 4, 2008    (CH) .......................................... 151/08

(51) Int. Cl.
*B25B 1/20*    (2006.01)
*B23Q 3/02*    (2006.01)
*B23Q 3/00*    (2006.01)

(52) U.S. Cl. ............. 269/95; 269/43; 269/45; 269/309; 269/101

(58) Field of Classification Search .......... 269/309–310, 269/43, 45, 71, 95
See application file for complete search history.

(56) References Cited

U.S. PATENT DOCUMENTS

| 114,651 | A |   | 5/1871 | Dick |   |
|---|---|---|---|---|---|
| 605,855 | A |   | 6/1898 | Colborne |   |
| 3,199,881 | A | * | 8/1965 | Duxbury | 279/123 |
| 3,587,073 | A | * | 6/1971 | Ghose et al. | 360/135 |
| 4,188,683 | A | * | 2/1980 | Klunder | 15/104.33 |
| 4,322,065 | A |   | 3/1982 | Doiron |   |
| 4,660,330 | A |   | 4/1987 | Fuchs |   |
| 4,969,635 | A |   | 11/1990 | Johansson et al. |   |
| 6,079,896 | A | * | 6/2000 | Dellach | 403/322.3 |
| 6,241,231 | B1 |   | 6/2001 | Schron, Jr. et al. |   |
| 6,748,841 | B1 | * | 6/2004 | Fritz | 81/57.41 |
| 7,029,213 | B2 | * | 4/2006 | Yerly | 409/218 |
| 7,290,760 | B1 | * | 11/2007 | Lindsay | 269/75 |
| 2005/0248103 | A1 |   | 11/2005 | Kramer |   |
| 2007/0063456 | A1 | * | 3/2007 | Troxler | 279/156 |
| 2007/0267798 | A1 | * | 11/2007 | Bonkowski | 269/101 |

FOREIGN PATENT DOCUMENTS

| CH | 0229474 |   | 10/1943 |
|---|---|---|---|
| DE | 4322589 |   | 12/1995 |
| GB | 0181613 |   | 6/1922 |
| GB | 2378409 | A | 12/2003 |

* cited by examiner

*Primary Examiner* — Monica Carter
*Assistant Examiner* — Seahee Yoon
(74) *Attorney, Agent, or Firm* — Maginot, Moore & Beck, LLP

(57) ABSTRACT

The clamping fixture (1) consists of a workpiece pallet (2) and an actuator (27). The workpiece pallet (2) comprises at least two clamping jaws (4,5) for clamping in place a workpiece, while the actuator (27) is provided for opening and closing the clamping jaws (4,5). By means of the actuator (27) the clamping jaws (4,5) are material-elastically excursionable to the extent that a workpiece, after release of the actuator (27), can be locked in place by the material-elastic restoring force of the clamping jaws (4,5). Preferably the workpiece pallet (2) comprises a main body (3) provided with a slot (6) defined on both sides by the clamping jaws (4,5). The clamping jaws (4,5) are material-elastic excursionable by means of the actuator (27) transversely to the slot (6). The clamping jaws (4,5) are provided with fitted jaws (13, 14) which in relation to each clamping jaw (4,5) can be shifted transversely to the slot (6).

14 Claims, 3 Drawing Sheets

WORKPIECE CLAMPING FIXTURE

BACKGROUND

The present invention relates to a workpiece clamping fixture.

Generic clamping fixtures serve particularly to clamp in place workpieces precisely positioned for machining, the clamping fixture usually featuring a workpiece pallet to mount or clamp each workpiece.

The workpiece pallet can either be directly secured to the work table of the machine tool or by means of a chuck, the workpiece pallet in the latter case featuring means for locking in place to the chuck and means for defining the position precisely located at the chuck. Especially the latter means needs to ensure exact positioning in both the X and Y as well as the Z direction.

In series production the workpieces—blanks—to be machined are usually inserted directly into the machine tool, for example by a 6-axes robotic attachment. In small series production the workpieces to be machined are clamped on pallets manually or automatically changed in the machine tool, whereas in medium series production clamping the workpieces in place is either complicated or the clamping fixture or pallet is relatively expensive.

SUMMARY OF INVENTION

The object of the invention is thus to create a clamping fixture which is particularly suitable for medium series production whilst having a simple configuration and being cost-effective in production so that the workpieces to be machined can now be clamped in place thereby in the workpiece pallet both quickly, simply and reliably safe.

By the clamping fixture now featuring a workpiece pallet comprising at least two material-elastic excursionable clamping jaws for holding the workpieces, the basic requirement for a clamping fixture of simple configuration is satisfied, by means of which the workpieces to be machined can now be clamped in place quickly, simply and reliably safe.

By the clamping fixture now featuring a workpiece pallet comprising at least two material-elastic deflectable clamping jaws for holding the workpieces, the basic requirement for a clamping fixture of simple configuration is satisfied, by means of which the workpieces to be machined can now be clamped in place quickly, simply and reliably safe.

DESCRIPTION OF THE FIGURES

The invention will now be detailed by way of an example embodiment as shown in the drawings in which.

DESCRIPTION OF EMBODIMENTS

Figure 1:
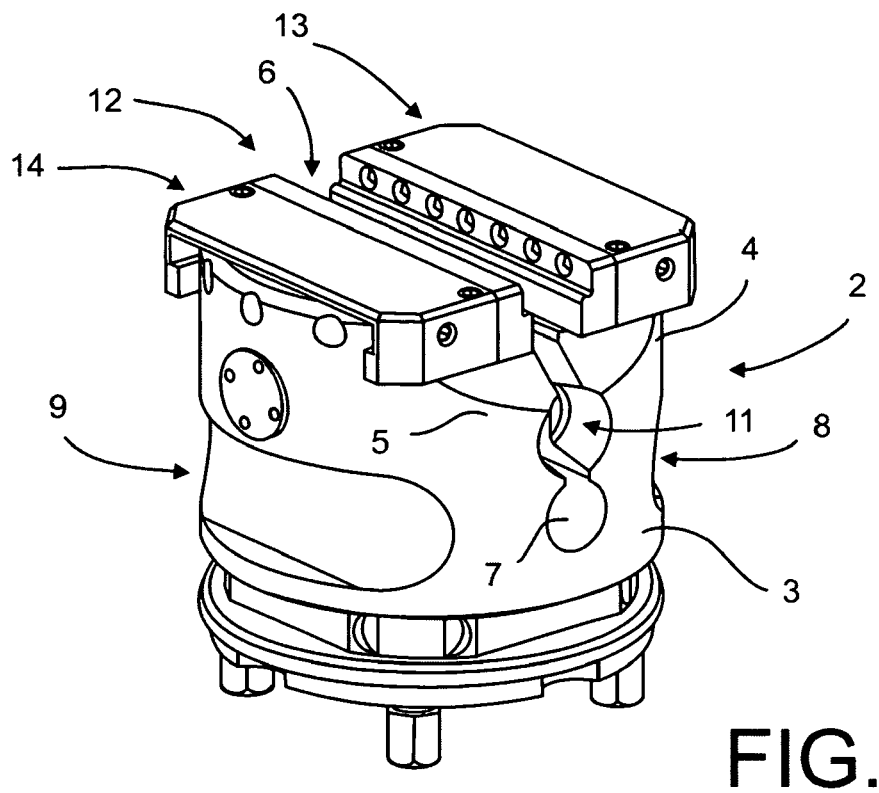
FIG. 1 is a view in perspective of a workpiece pallet.
Figure 2:
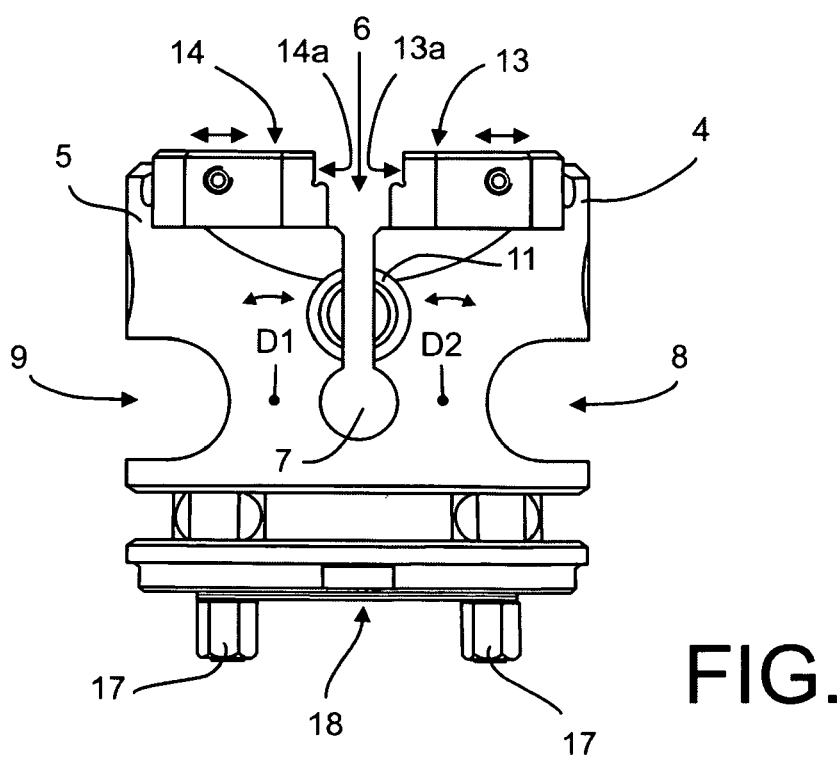
FIG. 2 is a side view of the workpiece pallet as set forth in FIG. 1.

Referring now to FIGS. 1 and 2 there is illustrated the basic configuration of the clamping fixture in accordance with the invention as will now be detailed, namely as regards the workpiece pallet 2. In addition to the workpiece pallet 2 the clamping fixture comprises an actuator not shown in the first two FIGS. which will be detailed later with reference to FIG. 4. FIG. 1 shows the workpiece pallet 2 in a view in perspective, whilst FIG. 2 shows the workpiece pallet 2 from the side. The workpiece pallet 2 serving to clamp the workpieces in place comprises a substantially cylindrical configured main body 3 having a central slot 6 to form two clamping jaws 4, 5. The slot 6 bottoms into a round concavity 7. To tweak the excursionable force or achievable clamping force needed for material-elastic excursion of the two clamping jaws 4, 5 radial incisions 8, 9 can be machined into the main body 3 on both sides of the concavity 7 oriented parallel to the slot 6. To avoid stress cracks the cited concavities 7, 8, 9 are preferably engineered round. The main body 3 is configured in one piece and is made preferably of hardened, stainless steel.

Machined in the main body 3 on both sides of the slot 6 is a conically tapered concavity 11, 12 each for insertion of a splaying tool or plug for splaying the two clamping jaws 4, 5. The two splaying tools form a component of the actuator as is detailed later on.

Referring now to FIGS. 1 and 2 there is illustrated the basic configuration of the clamping fixture in accordance with the invention as will now be detailed, namely as regards the workpiece pallet 2. In addition to the workpiece pallet 2 the clamping fixture comprises an actuator not shown in the first two FIGS. which will be detailed later with reference to FIG. 4. FIG. 1 shows the workpiece pallet 2 in a view in perspective, whilst FIG. 2 shows the workpiece pallet 2 from the side. The workpiece pallet 2 serving to clamp the workpieces in place comprises a substantially cylindrical configured main body 3 having a central slot 6 to form two clamping jaws 4, 5. The slot 6 bottoms into a round concavity 7. To tweak the deflection force or achievable clamping force needed for material-elastic deflection of the two clamping jaws 4, 5 radial incisions 8, 9 can be machined into the main body 3 on both sides of the concavity 7 oriented parallel to the slot 6. To avoid stress cracks the cited concavities 7, 8, 9 are preferably engineered round. The main body 3 is configured in one piece and is made preferably of hardened, stainless steel.

Where necessary, the two clamping jaws 4, 5 may be additionally connected to each other by a pull-rod. One such pull-rod is material-elastically extended in splaying the two clamping jaws 4, 5, it serving to increase the material-elastic restoring force of the two clamping jaws 4, 5 after removal of the splay tools which, of course, also correspondingly adds to the clamping force. It is understood that the material of the pull-rod as well as its dimensions can be selected and varied as required. When the main body 3 is correspondingly dimensioned it is possible, of course, to do away with a pull-rod.

In the present example, the workpiece mount is configured as a workpiece pallet 2 bottomed with supporting feet 17 and a centering disc 18. The centering disc 18 features four centering openings to precisely locate the workpiece pallet 2 on a chuck. The supporting feet 17 serve to secure the centering disc 18 to the main body 3. In addition, the supporting feet 17 act as a Z mount when clamping the workpiece pallet 2 to the chuck. The supporting feet 17 are directly threaded in the main body 3.

Figure 3:
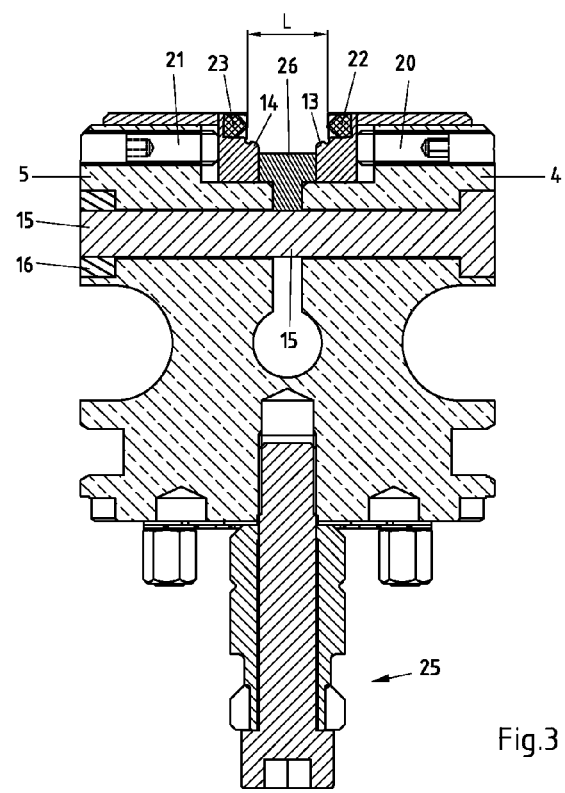
FIG. 3 is a cross-sectional view through the workpiece pallet.

Referring now to FIG. 3 there is illustrated a cross-sectional view through the workpiece pallet 2. Particularly evident from this view is how the main body 3 is engineered in one piece. In addition to this, it is evident how the centering disc 18 is secured by means of the supporting feet 17 to the underside of the main body 3.

Furthermore evident are the set screws 20, 21 serving to adjust each of the fitted jaws 13, 14 on each of the clamping jaws 4, 5. Provided in each of the fitted jaws 13, 14 is a total of three set screws 20, 21 by means of which the fitted jaws 13, 14 can be shifted transversely to the slot. The set screws 20, 21 are preferably engineered self-locking so that each of the fitted jaws 13, 14 after being shifted into position is locked and remains in place even after repeated splaying of the clamping jaws 4, 5. It is understood, of course, that also separate locking means may be provided by means of which the set screws 20, 21 and/or the fitted jaws 13, 14 can be locked in place in each position.

Additionally evident is how the fitted jaws 13, 14 are provided with sharp protuberances 22, 23 in the form of spikes. These protuberances 22, 23 promote positively locking in place a workpiece by biting into the surface of each workpiece. The protuberances 22, 23 are preferably made of a very hard material. Lastly evident on the underside of the main body 3 is a chucking spigot 25 secured by means of a thread, by means of which the workpiece pallet 2 can be locked in place on the chuck (not shown).

To set the fitted jaws 13, 14 to the thickness of the workpiece to be clamped in place a reference element 26 is preferably inserted in the workpiece pallet 2 and the fitted jaws 13, 14 shifted by means of the set screws 20, 21 until they are in snug contact with the sides of the reference element 26. The reference element 26 is dimensioned such that the gap L between the two fitted jaws 13, 14 is adjusted to be less (by a few tenths of a millimeter) than the thickness of the workpiece to be clamped in place To clamp a workpiece in the workpiece pallet 2, the two clamping jaws 4, 5 must first be splayed by the cited amount of a few tenths of a millimeter so that the workpiece to be clamped in place can be inserted between the fitted jaws 13, 14. It is understood that reference elements are available differing in thickness for the workpieces likewise differing in thickness.

Figure 4:
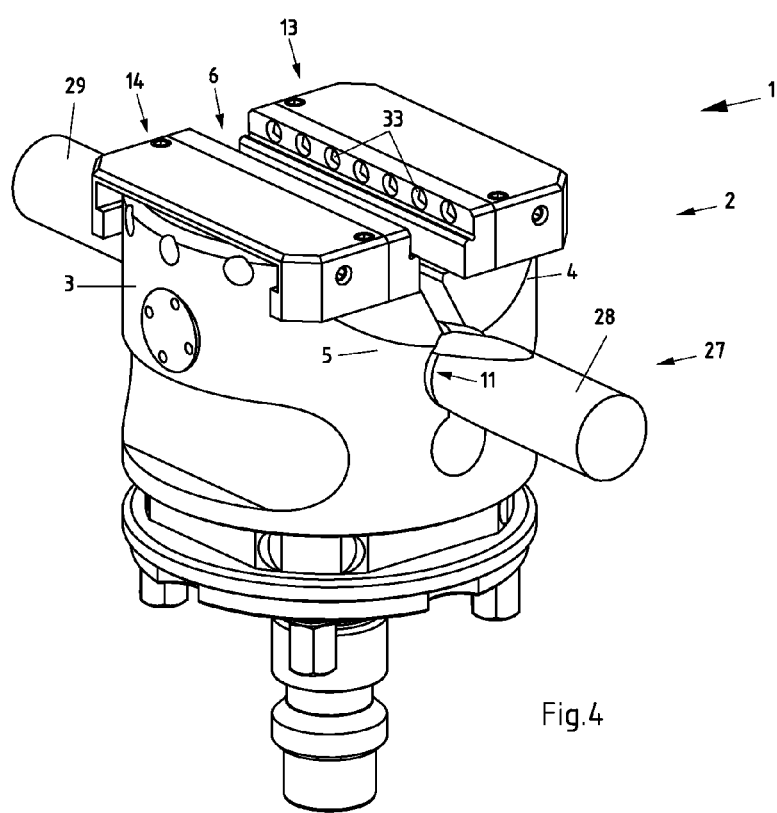
FIG. 4 is a view illustrating the clamping fixture comprising the workpiece pallet as set forth in FIG. 1 as well as an actuator merely indicated.

Additionally evident is how the fitted jaws 13, 14 are provided with sharp protuberances 22, 23 in the form of spikes. These protuberances 22, 23 promote positively locking in place a workpiece by biting into the surface of each workpiece. The protuberances 22, 23 are preferably made of a very hard material. The protuberances may be integrated with recesses 33, as shown in FIG. 4. Lastly evident on the underside of the main body 3 is a chucking spigot 25 secured by means of a thread, by means of which the workpiece pallet 2 can be locked in place on the chuck (not shown).

Referring now to FIG. 4 there is illustrated the complete clamping fixture 1 comprising the workpiece pallet 2 as well as the actuator 27 depicted diagrammatically. The actuator 27 includes in particular two splaying tools in the form of splaying plugs 28, 29 serving to splay the two clamping jaws 4, 5. The two splaying plugs 28, 29 are secured to a mechanical fixture (not shown) by means of which they can be inserted axially into conical concavities 11 translating sideways into the slot to provide the material-elastic excursion of the two clamping jaws 4, 5. A material-elastic excursion or pivoting of the clamping jaws 4, 5 is understood to be an elastic, i.e. reversible change in shape of the main body 3 in the region of the clamping jaws 4, 5. The conicity of the splaying plugs 28, 29 is selected so that no self-locking effect occurs in each of the concavities 11, it usually being the case that the two clamping jaws 4, 5 are material-elastically splayed by means of the actuator 27 by a few tenths of a millimeter. Once the two clamping jaws 4, 5 have been splayed by the cited amount a workpiece can be inserted between the two fitted jaws 13, 14. After release or removal of the actuator the two clamping jaws 4, 5 return inwards to their starting position, thereby locking in place the cited workpiece due to the material-elastic restoring force of the main body 3 made of steel.

Figure 5:
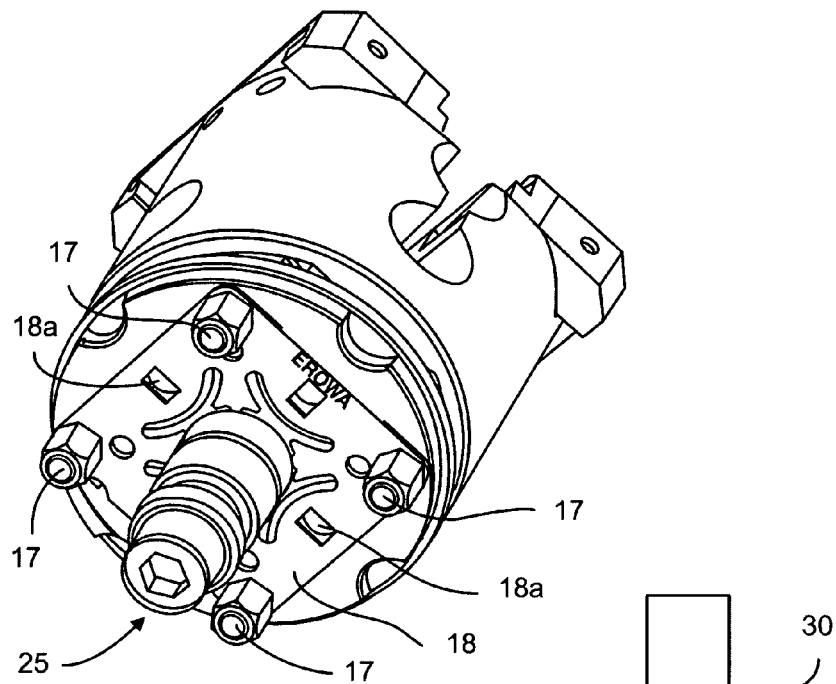
FIG. 5 is a view in perspective from underneath of the workpiece pallet.
Figure 6:
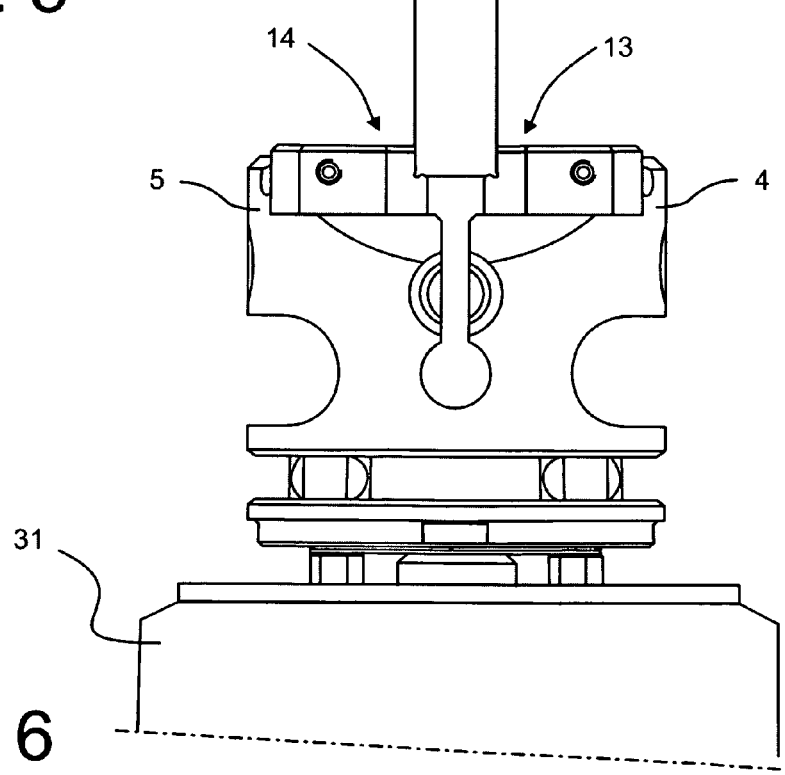
FIG. 6 is a view of the workpiece pallet as shown in FIG. 2 but together with a workpiece clamped in place and indicating a chuck.

Referring now to FIG. 5 there is illustrated the workpiece pallet 2 in a view in perspective as seen from underneath. Particularly evident in this view is how the centering disc 18 is secured by means of the supporting feet 17 to the underside of the main body 3. The centering disc 18 features four centering openings 18a making it possible to precisely position the workpiece pallet 2 in the X and Y direction at a chuck. When clamping the workpiece pallet 2 to the chuck the flat face of the supporting feet 17 acts as a Z mount. The workpiece pallet 2 is clamped to the chuck by means of the chucking spigot 25.

Referring now to FIG. 4 there is illustrated the complete clamping fixture 1 comprising the workpiece pallet 2 as well as the actuator 27 depicted diagrammatically. The actuator 27 includes in particular two splaying tools in the form of splaying plugs 28, 29 serving to splay the two clamping jaws 4, 5. The two splaying plugs 28, 29 are secured to a mechanical fixture (not shown) by means of which they can be inserted axially into conical concavities 11 translating sideways into the slot to provide the material-elastic deflection of the two clamping jaws 4, 5. A material-elastic deflection or pivoting of the clamping jaws 4, 5 is understood to be an elastic, i.e. reversible change in shape of the main body 3 in the region of the clamping jaws 4, 5. The conicity of the splaying plugs 28, 29 is selected so that no self-locking effect occurs in each of the concavities 11, it usually being the case that the two clamping jaws 4, 5 are material-elastically splayed by means of the actuator 27 by a few tenths of a millimeter. Once the two clamping jaws 4, 5 have been splayed by the cited amount a workpiece can be inserted between the two fitted jaws 13, 14. After release or removal of the actuator the two clamping jaws 4, 5 return inwards to their starting position, thereby locking in place the cited workpiece due to the material-elastic restoring force of the main body 3 made of steel.

Clamping a workpiece in the workpiece pallet 2 is usually done in tooling up, this station being provided for this purpose with the actuator 27 as described above for splaying the clamping jaws 4, 5. By splitting up the clamping fixture 1 into a passive workpiece pallet 2 and an active actuator 27 the clamping fixture 1 can be configured particularly simple.

The clamping fixture 1 configured in accordance with the invention is cost-effective to manufacture and permits workpieces to be locked in place both simply, speedily and precisely located. Splitting the clamping fixture 1 into a passive workpiece pallet 2 and an active actuator puts a ceiling on the costs of the clamping fixture, namely of each workpiece pallet 2. In addition to this, the adjustable fitted jaws ensure that workpieces differing in thickness are defined and held in place on the workpiece pallet 2.

Instead of the example embodiment as shown other variants of the clamping fixtures are, of course, feasible in the scope of the invention. For instance, the workpiece pallet 2 could be configured such that the two clamping jaws first need to be pressed together material-elastically so that a workpiece can be locked in place to the outer side of the clamping or fitted jaws. For this purpose the workpiece could feature, for example, a concavity for insertion of the clamping jaws. Instead of conical concavities the workpiece pallet could also be provided with protuberances for engaging by the actuator.

Where necessary, the slot 6 and/or the concavity 7 could be filled with an elastomer. This would, for one thing, reduce the tendency to soilage and, for another, the vibration response of the workpiece pallet 2 would be improved by the damping effect of the elastomer.

Making use of the material-elasticity of the main body, namely the material-elastic restoring force of the clamping jaws, for clamping in place a workpiece does away with the need of separate actuating elements for shifting and clamping the clamping jaws.

Although the clamping fixture in accordance with the invention is particularly suitable for medium series production, it can of course, because of its flexibility, also be used in small and large series production.

The invention claimed is:

1. A clamping fixture (1) featuring a workpiece pallet (2) for holding a workpiece for machining, the workpiece pallet (2) comprising means (25) for locking in place on a chuck (31) and means (18,18a) for precisely defining the position at the chuck (31), characterized in that the workpiece pallet (2) comprises at least two elastically deflectable clamping jaws (4, 5) for holding the workpiece (30) by the elastic restoring force of said clamping jaws, and the clamping fixture includes an actuator (27) for elastic splaying and/or contracting of the clamping jaws (4,5), the clamping jaws (4,5) being elastically deflectable by the actuator (27) for receiving the workpiece (30) to such an extent that the workpiece (30) after release of the actuator (27) can be locked in place by the elastic restoring force of the clamping jaws (4,5).

2. The clamping fixture (1) as set forth in claim 1, characterized in that the workpiece pallet (2) comprises a main body (3) provided with a slot (6) defined by the clamping jaws (4,5), the clamping jaws (4,5) being elastically deflectable transversely to the slot (6) and each workpiece (30) configured to be locked in place by the elastic restoring force of said clamping jaws (4,5).

3. The clamping fixture (1) as set forth in claim 2, characterized in that the main body (3) is configured in one piece and made of metal.

4. The clamping fixture (1) as set forth in claim 2, characterized in that the clamping jaws (4,5) are provided with fitted jaws (13, 14) mounted thereto for displacement transversely to the slot (6) so that a gap (L) between the fitted jaws (13, 14) is variable.

5. The clamping fixture (1) as set forth in claim 1, characterized in that the workpiece pallet (2) includes a main body provided with concavities (11) and/or protuberances for engagement by the actuator (27) for elastically deflecting said clamping jaws (4,5).

6. The clamping fixture (1) as set forth in claim 5, characterized in that said main body (3) is provided with a slot (6) defined by the clamping jaws (4,5) and machined on both sides of said slot (6) is a conical concavity (11) and further characterized in that the actuator (27) comprises two splaying plugs (28, 29) each configured for insertion into a respective one of the concavities (11) to splay the clamping jaws (4,5).

7. The clamping fixture (1) as set forth in claim 4, characterized in that the fitted jaws (13, 14) are configured to be replaceably engaged to said clamping jaws (4, 5).

8. The clamping fixture (1) as set forth in claim 1, characterized in that the clamping jaws (4, 5) or fitted jaws (13, 14) are configured to lock in place the workpiece (30), the clamping force being generated by elastic deflection of the clamping jaws (4, 5) or by the elastic restoring force of said clamping jaws.

9. The clamping fixture (1) as set forth in claim 2, characterized in that the slot (6) bottoms into a round concavity (7).

10. The clamping fixture (1) as set forth in claim 4, characterized in that the fitted jaws (13, 14) are provided with protuberances (22, 23) and/or recesses (33) for achieving a positive engagement with the workpiece (30).

11. The clamping fixture (1) as set forth in claim 1, characterized in that the workpiece pallet (2) is provided at the underside with a chucking spigot (25) for locking it in place at the chuck (31).

12. The clamping fixture (1) as set forth in claim 1, characterized in that the workpiece pallet (2) is provided at the underside with at least three centering openings to precisely define the position at the chuck (31).

13. The clamping fixture (1) as set forth in claim 12, characterized in that the workpiece pallet (2) includes a main body (3) provided at an underside with a centering disc (18) defining said centering openings (18a), the centering disc (18) being secured by means of supporting feet (17) on the main body (3).

14. A clamping fixture (1) featuring a workpiece pallet (2) for holding a workpiece for machining, the workpiece pallet (2) comprising means (25) for locking in place on a chuck (31) and means (18,18a) for precisely defining the position at the chuck (31), characterized in that:
- the workpiece pallet (2) comprises at least two elastically deflectable clamping jaws (4, 5) for holding the workpiece (30) by the elastic restoring force of said clamping jaws,
- the workpiece pallet (2) comprises a main body (3) provided with a slot (6) defined by the clamping jaws (4,5), the clamping jaws (4,5) being elastically deflectable transversely to the slot (6) and each workpiece (30) configured to be locked in place by the elastic restoring force of said clamping jaws (4,5);
- the clamping jaws (4,5) are provided with fitted jaws (13, 14) mounted thereto for displacement transversely to the slot (6) so that a gap (L) between the fitted jaws (13, 14) is variable and
- the clamping fixture (1) includes a reference element (26) configured for removable insertion between said fitted jaws for setting the gap between the fitted jaws (13, 14).

* * * * *